United States Patent [19]
West et al.

[11] Patent Number: 6,088,815
[45] Date of Patent: Jul. 11, 2000

[54] AUTOMATIC DATA RECOVERY FOR A DUPLEX PAIR

[75] Inventors: Christopher James West; David Grant Beal, both of Boulder; Michael Steven Milillo, Louisville, all of Colo.

[73] Assignee: International Busines Machines Corporation, Armonk, N.Y.

[21] Appl. No.: 09/027,935

[22] Filed: Feb. 23, 1998

[51] Int. Cl.[7] .................................................. G06F 13/00
[52] U.S. Cl. ................... 714/15; 714/5; 714/6; 714/7; 714/15; 714/16; 714/2; 714/25; 711/162
[58] Field of Search ................................. 714/15, 5, 6, 7, 714/25, 2, 16; 711/162

[56] References Cited

U.S. PATENT DOCUMENTS

| | | | |
|---|---|---|---|
| 5,159,671 | 10/1992 | Iwami | 710/20 |
| 5,446,871 | 8/1995 | Shomler | 714/1 |
| 5,504,861 | 4/1996 | Crockett | 714/13 |
| 5,544,347 | 8/1996 | Yanai | 711/162 |
| 5,592,618 | 1/1997 | Micka | 714/54 |
| 5,657,440 | 8/1997 | Micka | 359/686 |
| 5,692,155 | 11/1997 | Iskiyan | 711/162 |
| 5,835,954 | 11/1998 | Duyanovich et al. | 711/162 |
| 5,870,537 | 2/1999 | Kern | 714/6 |
| 5,889,935 | 3/1999 | Ofek | 714/6 |

*Primary Examiner*—Robert W. Beausoliel, Jr.
*Assistant Examiner*—Bryce Bonzo
*Attorney, Agent, or Firm*—Sawyer Law Group LLP; Esther Klein, Esq.

[57] ABSTRACT

A method and system for the automatic data recovery for a duplex pair is provided. The preferred embodiment includes the discovery of lost data on the first subsystem. A copy of the lost data is automatically transferred from the second subsystem to the first subsystem. Then the copy of the lost data is automatically written into the first subsystem. The host processor and the operator is unaware data had been lost. The method and system of the present invention eliminates the need to terminate the job which triggered the discovery of the lost data. It also eliminates the need for any involvement of the operator in the data recovery process.

8 Claims, 4 Drawing Sheets

AUTOMATIC DATA RECOVERY FOR A DUPLEX PAIR

FIELD OF THE INVENTION

The present invention relates to data processing systems and more particularly to improving data recovery in a data processing system for data stored as a duplex pair.

BACKGROUND OF THE INVENTION

The reliable recovery of data backups is very important to many industries today. Businesses such as banks, airlines, and hotels face the possibility of large financial losses if data is unrecoverable due to a computer malfunction or an earthquake, flood, or some other natural disaster.

One conventional technique for recovering backup data involves the maintenance of data in "duplex pairs." In a duplex pair configuration, each time data is written on a disk or some other storage media, a duplicate copy is written on a backup disk as well. One particular method of creating duplex pairs of data is the Peer-to-Peer Remote Copy (PPRC) procedure. Duplex pairs and PPRC are well known in the art and will not be discussed in detail here.

FIG. 1 illustrates a system which uses the PPRC procedure. The system 100 includes a primary host processor 102 which is connected to a primary subsystem 104 on which the data 106 is stored. The primary subsystem 104 is connected via cable 108 to a secondary subsystem 112 at a remote site on which a copy of the data 114 is stored. This secondary subsystem 112 could be connected to a secondary host processor but need not be. Each time data is written or changed on the primary subsystem 104, the primary subsystem 104 will transfer and write a copy of the data to the secondary subsystem 112. In this manner, the data and its duplicate are maintained in pairs. In this system, only the primary subsystem 104 can write to the secondary subsystem 112. Otherwise the data on the primary and the secondary subsystems will not be in sync. This would compromise the reliability of the backup data.

One problem with duplex pairs is the cumbersome nature of the recovery of data.

In the current state of the art, the operator 116 discovers data to be damaged or lost, typically through the issuance of a read command to the primary subsystem 104, via the primary host processor 102. Upon issuance of this command, the primary subsystem 104 responds to fetch the data and discovers the data loss. The primary subsystem 104 terminates the job and gives the primary host 102 a data error status. The primary host processor 102 recognizes the data error and notifies the operator 116 of the error. The operator 116 must manually access the secondary subsystem 112 and request to read the copy of the lost data. The operator 116 then manually commands the transfer of this data from the secondary subsystem 112 to the primary subsystem 104 and commands the rewrite of the data onto the primary subsystem 104. In this way, the lost data is recovered. The operator 116 then must restart the job.

The data recovery process is equally cumbersome when the secondary subsystem loses data. A secondary subsystem 112 will discover it has lost data during a typical operation, such as the management of available addressable space on a disk, commonly referred to in the field as "free space collection." This operation is well known in the art and will not be further described here. When a secondary subsystem 112 discovers it has lost data, it goes into a suspended state. It then broadcasts this changed state to the operator 116, who then must manually recopy the lost data from the primary subsystem and reestablish the duplex pair.

These methods of recovering data requires the termination of the job and the extensive involvement of the operator. Therefore, there is a need for a method of recovering lost data maintained in duplex pairs which does not require the termination of the job and does not require the involvement of the operator. The present invention addresses such a need.

SUMMARY OF THE INVENTION

A method and system for the automatic data recovery for a duplex pair is provided. The preferred embodiment includes the discovery of lost data on the first subsystem. A copy of the lost data is automatically transferred from the second subsystem to the first subsystem. Then the copy of the lost data is automatically written into the first subsystem. The host processor and the operator is unaware data had been lost. The method and system of the present invention eliminates the need to terminate the job which triggered the discovery of the lost data. It also eliminates the need for any involvement of the operator in the data recovery process.

DETAILED DESCRIPTION OF THE INVENTION

The present invention is related to providing a method and system for an automatic data recovery for data stored in a duplex pair. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
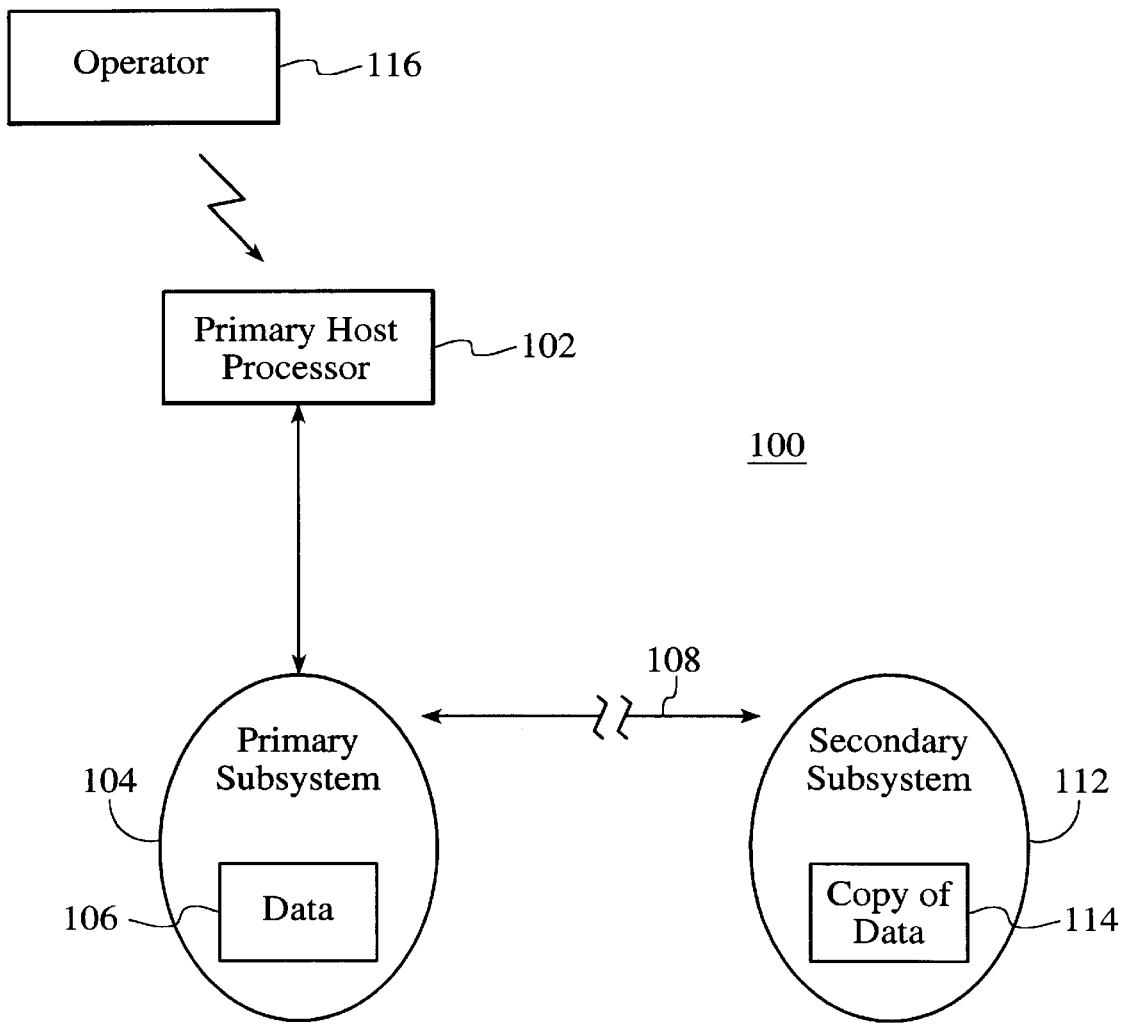
FIG. 1 illustrates a system in which data and a copy of the data are maintained in duplex pairs.
Figure 2:
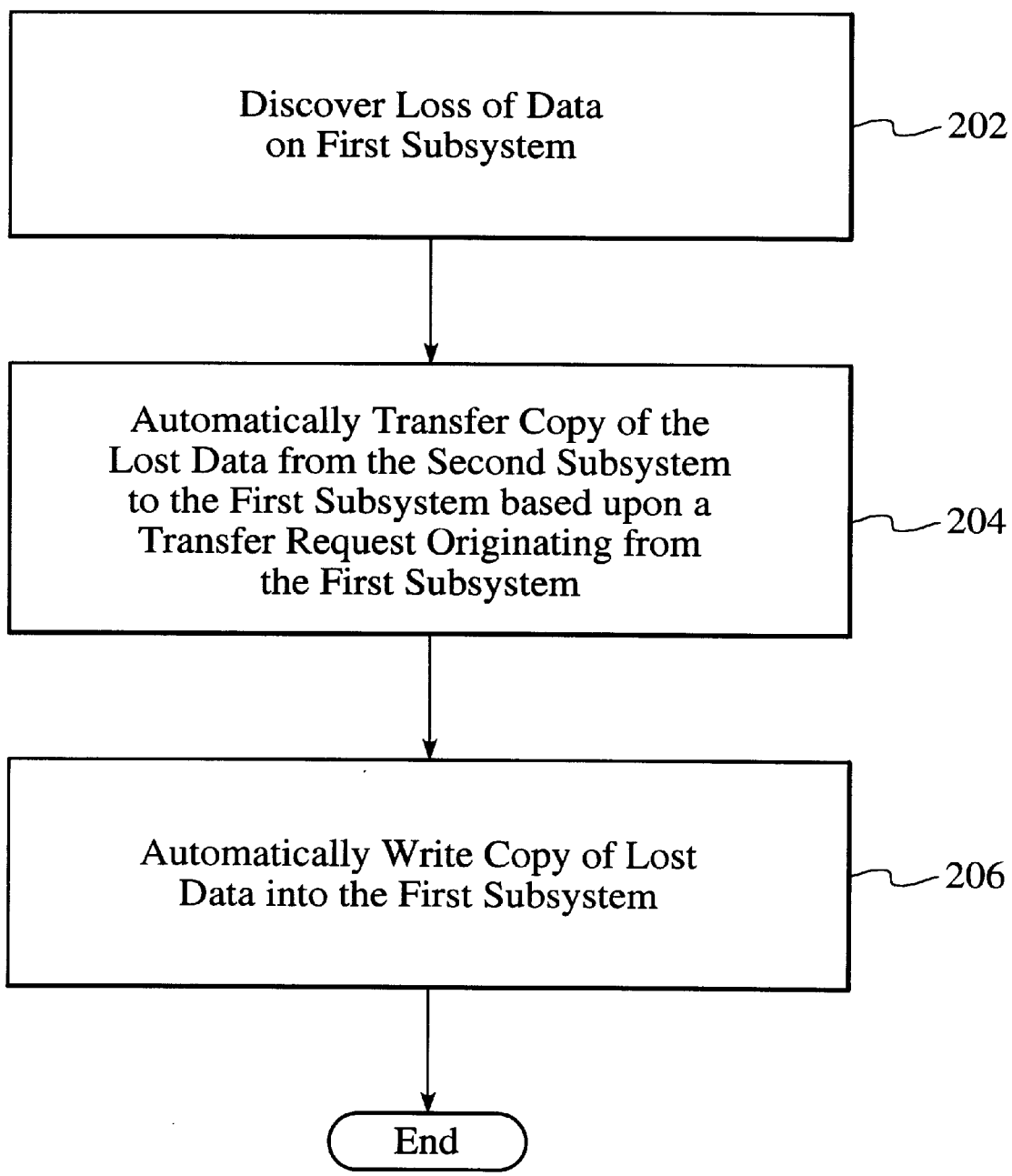
FIG. 2 is a simple flow chart of the method in accordance with the present invention.
Figure 3:
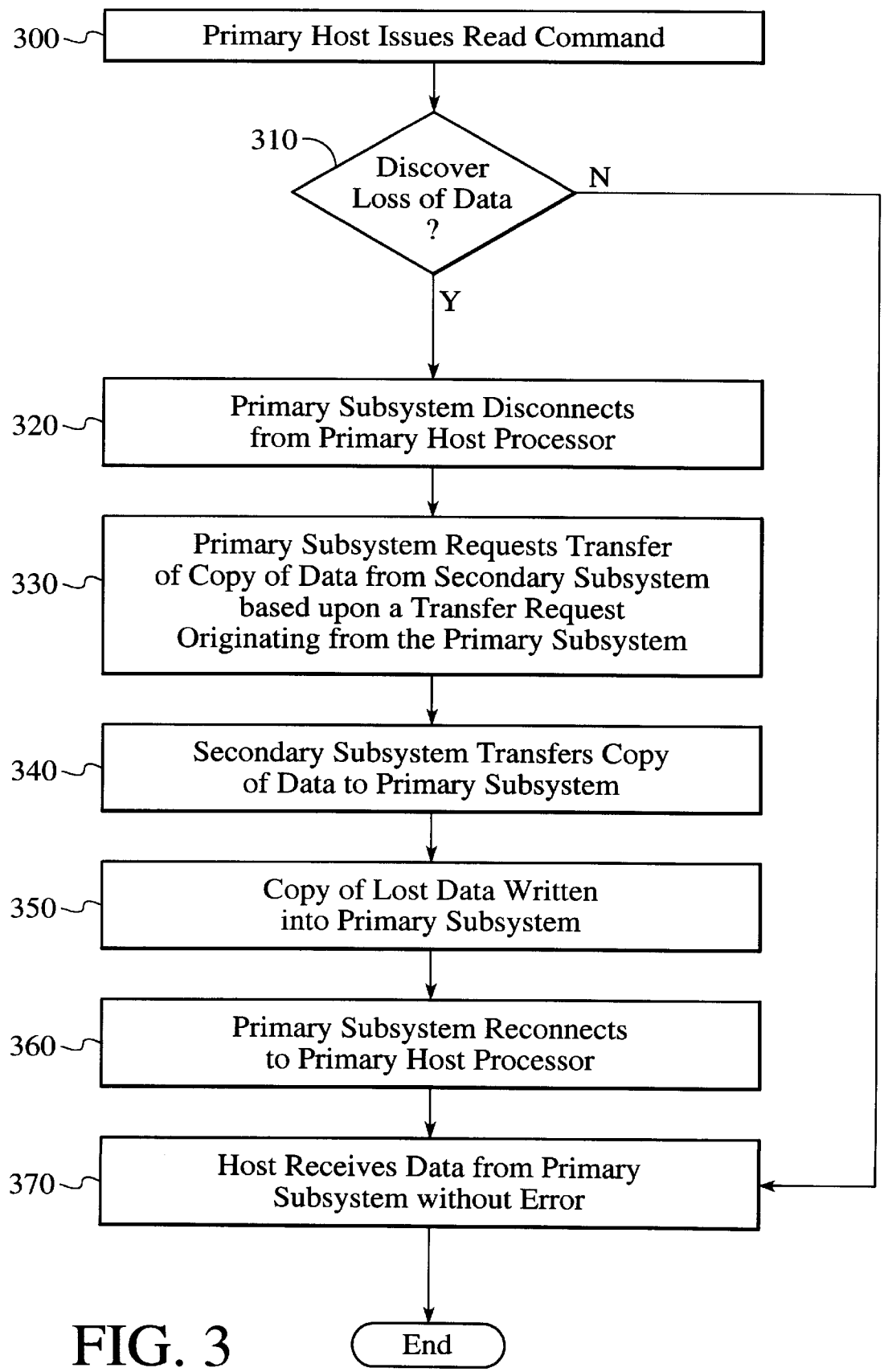
FIG. 3 is a flow chart of the first preferred embodiment of the method in accordance with the present invention.
Figure 4:
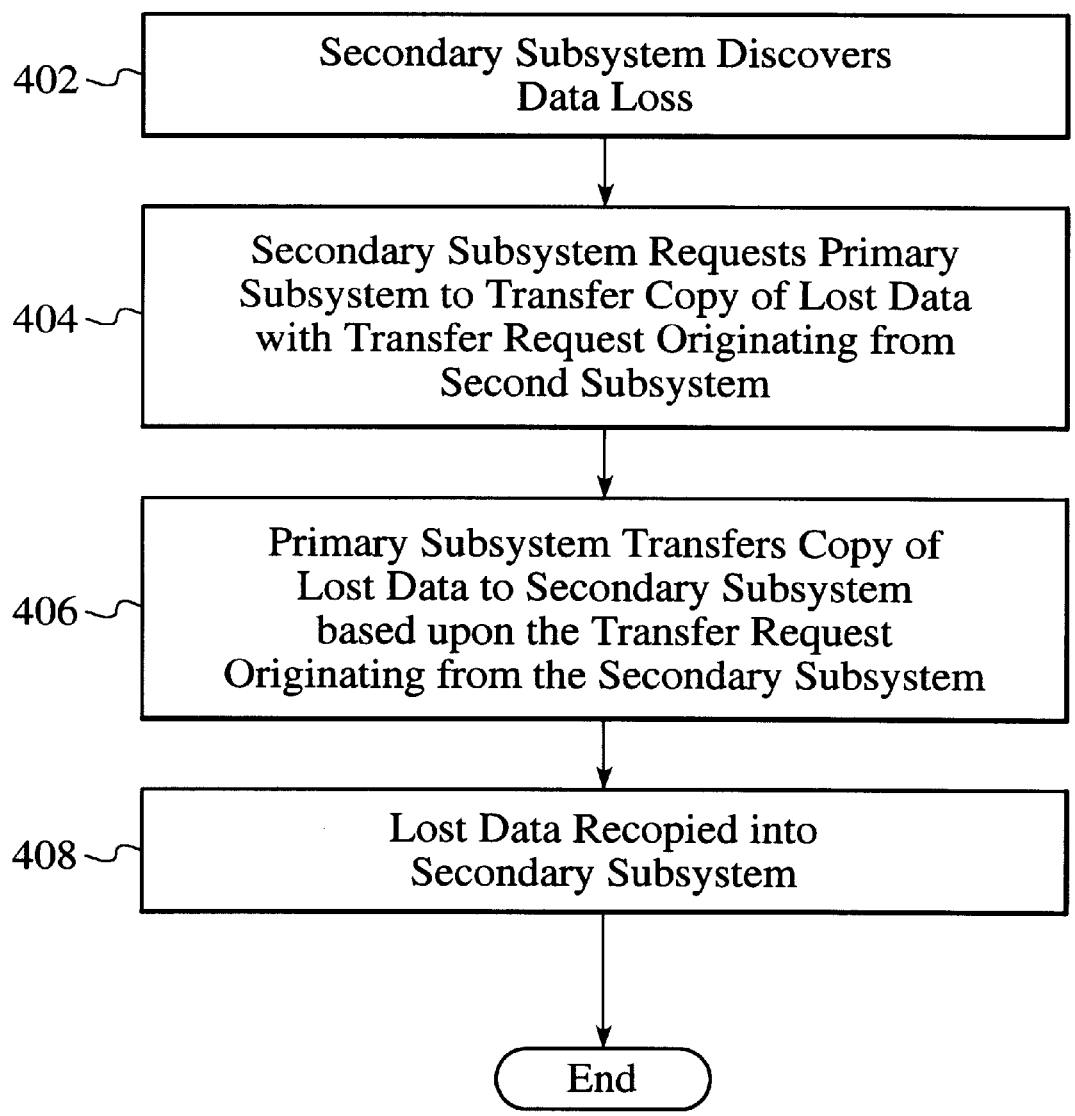
FIG. 4 is a flow chart of the second preferred embodiment of the method in accordance with the present invention.

To more particularly describe the present invention, please refer to FIGS. 2 through 4 and the following discussion. FIG. 2 is a simple flow chart of the method and system in accordance with the present invention which may be utilized in the system 100 of FIG. 1. Data recovery begins with the first subsystem discovering that the data has been lost, via step 202. The first subsystem then automatically executes a transfer of a copy of the lost data from the second subsystem to the first subsystem, via step 204. This data is then automatically written into the first subsystem, via step 206.

FIG. 3 illustrates a first preferred embodiment of the method and system of the present invention. In this embodiment, the first subsystem is the primary subsystem 104 while the second subsystem is the secondary subsystem 112, and the data is lost in a particular location on the primary subsystem 104. It begins with the primary host processor 102 issuing a read command to the primary subsystem 104, via step 300. The primary subsystem 104 discovers the lost data in its attempt to execute the read command, via step 310. Upon this discovery, the primary subsystem 104 disconnects from the primary host processor 102, via step 320. Disconnection allows the primary host processor 102 to issue commands to other devices in a computer system while the primary subsystem 104 completes its execution of the read command. Instead of terminating the job and giving the operator 116 an error status as with the prior art, in accordance with the present invention the primary subsystem 104 requests a copy of the lost data from the secondary subsystem 112, via step 330. This request originates from the primary subsystem 104. The secondary subsystem 112 transfers a copy of the data to the primary subsystem 104, via step 340, which then writes it into the primary subsystem 104, via step 350. The primary subsystem 104 reconnects with the primary host processor 102, via step 360, and the primary host processor 102 receives the data from the primary subsystem 104 without error, via step 370. Thus, the lost data on the primary subsystem has been automatically recovered from the backup data.

This method occurs without the knowledge of the host processor or the operator because the primary subsystem 104 automatically recovers the lost data before returning the results of the read. No involvement of the operator 116 is required for the recovery, and the job need not be terminated to accomplish the recovery. This method increases the reliability of the data.

Although the present invention is described with discovery of lost data being triggered by the execution of a read command, one of ordinary skill in the art will understand that other operations by the system 100 may lead to discovery of lost data and can also be used to trigger the method described in the preferred embodiment of the present invention without departing from the spirit and scope of the present invention.

FIG. 4 illustrates a second preferred embodiment of the method and system in accordance with the present invention. In this embodiment, the first subsystem is the secondary subsystem 112 while the second subsystem is the primary subsystem 104. In this embodiment, the data lost is on the secondary subsystem 112 instead of the primary subsystem 104. The secondary subsystem 112 discovers data has been lost during the execution of a typical subsystem operation, such as during management of available addressable space on a disk of the subsystem, via step 402. After the secondary subsystem 112 discovers that data has been lost, via step 402, it will send a request to the primary subsystem 112 to transfer a copy of the lost data without suspending its status or sending an error status to the operator 116 as in the prior art, via step 404. This request originates from the secondary subsystem 112. The primary subsystem 104 transfers a copy of the lost data to the secondary subsystem 112, via step 406. Then the lost data is written into the secondary subsystem 112, via step 408. The host processors 102, 110 and the operator 116 will not even be aware there had been a loss of data. Thus, the reliability of the backup data is increased.

Through the method and system of the present invention, automatic data recovery for a duplex pair is provided. It eliminates the need for extensive operator involvement in data recovery and eliminates the need to terminate and then reinitialize jobs due to data loss. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims. For example, although the present invention has been described in the context of duplex pairs stored on a primary and one secondary subsystem, one of ordinary skill in the art will understand that the method could be modified to apply to multiple copies of data, and to any system in which data is written to more than one disk but can only be read from one disk, without departing from the spirit and scope of the present invention.

What is claimed is:

1. A method for recovering duplex data pairs in a data processing system, the data processing system including a first subsystem and a second subsystem, the second subsystem having a copy of the data on the first subsystem, comprising sequentially the steps of:

1) discovering data loss on the first subsystem;
   2) transferring a copy of a lost data from the second subsystem to the first subsystem based upon a transfer request originating from the first subsystem; and
   3) writing the copy of the lost data into the first subsystem wherein the transferring and writing steps recover the lost data on the first subsystem.

2. The method in claim 1 wherein the discovering step 1) may occur during the execution of a read command.

3. The method in claim 1 wherein the discovering step 1) may occur during management of available addressable space on the first subsystem.

4. The method of claim 1 wherein the automatically transferring step 2) comprises the steps of:

1) the first subsystem disconnecting from a host processor;
   2) the first subsystem sending the transfer request to transfer the copy of the lost data from the second subsystem, wherein the transfer request originates from the first subsystem; and
   3) the second subsystem transferring the copy of the data to the first subsystem.

5. The method in claim 1 wherein the automatically waiting step 3) comprises the steps of:

1) the first subsystem reconnecting to a first host processor; and
   2) the first host processor receiving data from the first subsystem.

6. A method for recovering duplex data pairs in a data processing system, the data processing system including a primary subsystem and a secondary subsystem, the secondary subsystem having a copy of the data on the primary subsystem, a primary host processor connected to the primary subsystem, comprising sequentially the steps of:

1) issuing a read command to the primary subsystem by the primary host processor;
   2) discovering data loss on the primary subsystem;
   3) disconnecting the primary subsystem from the primary host processor;
   4) requesting a transfer of a copy of a lost data from the secondary subsystem to the primary subsystem based upon a transfer request originating from the primary subsystem;
   5) transferring the copy of the lost data from the secondary subsystem to the primary subsystem;
   6) writing the copy of the lost data into the primary subsystem;
   7) reconnecting the primary subsystem to the primary host processor; and 8) receiving the data from the primary subsystem by the primary host processor.

7. A method for recovering duplex data pairs in a data processing system, the data processing system including a primary subsystem and a secondary subsystem, the secondary subsystem having a copy of the data on the primary subsystem, comprising sequentially the steps of:

1) discovering data loss on the secondary subsystem;
2) requesting a transfer of a copy of a lost data from the primary subsystem to the secondary subsystem with the request originating from the secondary subsystem;
3) transferring the copy of the lost data from the primary subsystem to the secondary subsystem based upon the transfer request originating from the secondary subsystem; and
4) writing the lost data into the secondary subsystem, wherein the transferring and writing steps recover the lost data on the second subsystem.

8. A computer readable medium with computer instructions for recovering duplex data pairs in a data processing system, the data processing system including a first subsystem and a second subsystem, the second subsystem having a copy of the data on the first subsystem, the computer instructions for:

1) discovering data loss on the first subsystem;
2) automatically transferring a copy of a lost data from the first subsystem to the second subsystem based upon a transfer request originating from the first subsystem; and
3) writing the copy of the lost data into the first subsystem, wherein the transferring and writing steps recover the lost data on the first subsystem.

* * * * *